US012784119B2

(12) United States Patent
Rakhmatulina et al.

(10) Patent No.: US 12,784,119 B2
(45) Date of Patent: Nov. 3, 2026

(54) MACHINE-LEARNING BASED METHOD FOR ASSESSING ACADEMIC PERFORMANCE OF A LEARNER AND PROVIDING LEARNING RECOMMENDATIONS FOR THE LEARNER

(71) Applicants: Constructor Technology AG, Schaffhausen (CH); Constructor Education and Research Genossenschaft, Schaffhausen (CH)

(72) Inventors: Rasilia Rakhmatulina, Sofia (BG); Andrey Adaschik, Istanbul (TR); Victor Batraev, Sofia (BG); Serg Bell, Singapore (SG); Stanislav Protasov, Singapore (SG); Nikolay Dobrovolskiy, Alanya (TR); Laurent Dedenis, Geneva (CH)

(73) Assignee: Constructor Technology AG, Schaffhausen (CH)

(*) Notice: Subject to any disclaimer, the term of this patent is extended or adjusted under 35 U.S.C. 154(b) by 0 days.

(21) Appl. No.: 18/983,799

(22) Filed: Dec. 17, 2024

(65) Prior Publication Data

US 2026/0170583 A1 Jun. 18, 2026

(51) Int. Cl.
*G06Q 30/00* (2023.01)
*G06N 3/088* (2023.01)
(Continued)

(52) U.S. Cl.
CPC ........... *G06Q 50/205* (2013.01); *G06N 3/088* (2013.01); *G09B 7/04* (2013.01)

(58) Field of Classification Search
CPC ......... G06Q 50/205; G06N 3/088; G09B 7/04
See application file for complete search history.

(56) References Cited

U.S. PATENT DOCUMENTS

2020/0302296 A1* 9/2020 Miller ...................... G09B 5/00
2024/0370804 A1* 11/2024 Wolochow ........... G06Q 50/205
(Continued)

OTHER PUBLICATIONS

"The AI Companion in Education: Analyzing the Pedagogical Potential of ChatGPT in Computer Science and Engineering".IEEE. 2024. (Year: 2024).*
(Continued)

*Primary Examiner* — Maria V Vanderhorst
(74) *Attorney, Agent, or Firm* — ArentFox Schiff LLP; Michael Fainberg

(57) ABSTRACT

Disclosed herein are systems and methods for a machine-learning based method for assessing academic performance of a learner and providing learning recommendations. The method includes obtaining assessment materials for a learner. The method also includes analyzing answers using a trained test assessment LLM. The method includes analyzing the test feedback using a trained course assessment LLM configured to evaluate a proficiency with the course materials and to generate a course feedback comprising expected answers and indicating a level of proficiency with the course materials. The method includes analyzing the course feedback to evaluate a proficiency with topics of study based on the course feedback for given topics and the past academic performance data of the learner, and to generate a topic feedback. The method further includes generating a plurality of personalized learning recommendations for topics of study in which the learner has a level of proficiency below a proficiency threshold.

20 Claims, 5 Drawing Sheets

100

(51) Int. Cl.
*G06Q 50/20* (2012.01)
*G09B 7/04* (2006.01)
*G05B 19/418* (2006.01)

(56) References Cited

U.S. PATENT DOCUMENTS

2024/0379019 A1* 11/2024 Naufel .................... G06F 40/40
2025/0201143 A1* 6/2025 Kimpel .................... G09B 7/02

OTHER PUBLICATIONS

"Educational Data Mining: A Systematic Review on the Applications of Classical Methods and Deep Learning Until 2022". IEEE. 2023 (Year: 2023).*

* cited by examiner

300

MACHINE-LEARNING BASED METHOD FOR ASSESSING ACADEMIC PERFORMANCE OF A LEARNER AND PROVIDING LEARNING RECOMMENDATIONS FOR THE LEARNER

FIELD OF TECHNOLOGY

The present disclosure relates to the field of examination proctoring, and, more specifically, to systems and methods for machine-learning based methods for assessing academic performance of a learner and providing learning recommendations for the learner.

BACKGROUND

Examinations are now commonly taken on computers, offering convenience and accessibility for both learners and institutions. These computer examinations are conducted through specialized software or platforms that allow learners to take tests from remote locations. They often include features like automated proctoring, performance analysis, and instant grading. However, generating personalized feedback for learners taking online examinations presents several challenges and issues. One major concern is the accuracy and relevance of the feedback, as automated systems may struggle to fully understand the nuances of learners'responses, especially in open-ended or complex questions. Additionally, technical limitations, such as poor algorithms or insufficient data on learner performance, can lead to generic or unhelpful feedback. There is also the risk of overwhelming learners with too much information or feedback that is too difficult to interpret. Finally, ensuring fairness in feedback generation, particularly for learners with diverse learning needs, remains a critical challenge in achieving equitable education outcomes.

SUMMARY

To address the shortcoming of online proctoring systems, the present disclosure describes a system and method for assessing academic performance of a user taking an online examination and generating personalizing learning feedback for the user using machine-learning based methods. Some of the technical improvements of the present disclosure is the ability to train and use machine learning (ML) models to efficiently assess the performance of a large number of users (e.g., learners or students) simultaneously by automating the feedback process without the need for manual grading, and making it suitable for large-scale assessments. In addition, the present disclosure describes using trained machine learning models to provide immediate, personalized feedback based on the users'performance allowing the present disclosure to quickly identify areas for improvement and help users adjust their study strategies accordingly. By analyzing vast amounts of data, ML models can identify patterns in learner behavior, learning styles, and common mistakes. This leads to more informed feedback that is tailored to each learner's unique learning trajectory. In addition, trained ML models can adapt feedback based on individual performance, offering progressively harder or more tailored questions, resources, and feedback as the learner advances, fostering personalized learning paths.

Other technical benefits of the present disclosure include implementing an efficient and consistent grading and analysis system because automated assessment and feedback generation eliminate human error and bias, ensuring consistent and objective evaluation across different learners and exams. The ML models may also incorporate diverse inputs like time taken to answer, question difficulty, and even previous assessments to generate holistic and highly specific feedback, addressing each learner's specific strengths and weaknesses. Finally, the present disclosure provides continuous improvement of the grading and analysis system because, over time, the ML models can refine their feedback generation capabilities by learning from the growing body of data, improving their effectiveness and relevance as more learners use the system.

In one exemplary aspect, a method for assessing academic performance of a learner and providing learning recommendations for the learner is disclosed. The method includes: obtaining assessment materials for a learner comprising at least: a plurality of test questions for an academic course taken by the learner, answers from the learner to the plurality of test questions, correct answers to the plurality of test questions, course materials, and past academic performance data for the course by the learner and one or more other courses completed by the learner in a program of study of the learner, wherein the test questions are directed to a plurality of topics of study covered by the course and one or more other courses completed by the learner within the program of study; analyzing the answers using a trained test assessment LLM configured to check correctness of the answers against the correct test answers and to generate a test feedback indicating a level of proficiency with the test materials; analyzing the test feedback using a trained course assessment LLM configured to evaluate a proficiency with the course materials based on the test feedback and to generate a course feedback comprising expected answers and indicating a level of proficiency with the course materials; analyzing the course feedback using a trained topic assessment LLM configured to evaluate a proficiency with one or more topics of study based on the course feedback for given topics and the past academic performance data of the learner for the one or more other courses completed by the learner that cover the given topics, and to generate a topic feedback comprising a performance of the learner in other topics related to the course materials and a failure risk regarding the course materials; and, based on the topic feedback, generating, by a processor, and providing, via a user interface (UI), a plurality of personalized learning recommendations for one or more topics of study in which the learner has a level of proficiency below a proficiency threshold, wherein the plurality of personalized learning recommendations are based on the topic feedback.

In some aspects, the techniques describe herein relate to a method, wherein generating the plurality of personalized learning recommendations for the learner further includes: analyzing the topic feedback using a trained learning recommendations LLM configured to generate personalized learning recommendations based at least in part on the course materials.

In some aspects, the techniques described herein relate to a method further including: collecting past academic performance data of the learner for the course and one or more other courses completed by the learner in the program of study for the learner; collecting data about areas of interests of the learner related to the program of study; analyzing the collected data using a trained learner performance assessment LLM configured to evaluate an overall academic performance of the learner within the program of study and proficiency with one or more topics of study and areas of interests, and to generate a score of proficiency for each topic of study and each area of interest; and providing the generated scores to the trained topic assessment LLM for generating the topic feedback indicating a level of proficiency with one or more topics of study.

In some aspects, the techniques described herein relate to a method, wherein the trained topic assessment LLM includes one or more of: a classification model, a regression classification model, an autoencoder neural network, or a neural network model, wherein the trained test assessment and the trained course assessment comprises a LLM.

In some aspects, the techniques described herein relate to a method further including: preparing the trained test assessment LLM by: (i) providing, to the trained test assessment LLM, a training dataset comprising at least one of: (a) a plurality of test questions, (b) a plurality of graded answers corresponding to the plurality of test questions indicating at least labeled correct answers, labeled partially correct answers, labeled incorrect answers, or explanation from the course materials, and (c) a plurality of scoring criteria corresponding to how a score is assigned, including: assigning different weights for at least conceptual understanding, accuracy, clarity, organization, style, or completeness, (d) descriptions of different proficiency levels with the test materials and criteria for each proficiency level, (e) labeled examples of test feedback provided by instructors including at least positive feedback, negative feedback, and constructive criticism, and (ii) preparing the trained test assessment LLM using the provided training dataset.

In some aspects, the techniques described herein relate to a method, wherein analyzing the test feedback using the trained course assessment LLM further includes using a handbook comprising expected answers configured to enhance feedback based on achieving assessment criteria.

In some aspects, the techniques described herein relate to a method further including: obtaining time-series data corresponding to user engagement with a system configured to facilitate the plurality of test questions for the academic course, wherein the time-series data comprises at least one of click data or engagement metrics with content from the course, wherein evaluating the proficiency with the one or more topics of study and generating the topic feedback is based on analyzing the time-series data configured to provide insight into behavioral patterns of the learner In some aspects, the techniques described herein relate to a method further including: preparing the trained course assessment LLM by: (i) providing, to the trained course assessment LLM, a training dataset comprising at least: (a) course material, (b) a plurality of test questions, (c) a plurality of graded test data corresponding to the test questions indicating at least labeled correct answers, labeled partially correct answers, or labeled incorrect answers, (d) descriptions of different proficiency levels with the course material and criteria for each level, (e) labeled examples of categorized course feedback provided by instructors including at least positive feedback, negative feedback, and constructive criticism, and (f) historical course feedback summary comprising at least connections between the test feedback and overall course feedback, and (ii) preparing the course assessment LLM using the provided training dataset.

In some aspects, the techniques described herein relate to a method further including: preparing the trained topic assessment LLM by: (i) providing, to the trained topic assessment LLM, a training dataset comprising at least: (a) course material, (b) a plurality of test questions, (c) a plurality of graded test data corresponding to the plurality of test questions indicating at least labeled correct answers, labeled partially correct answers, or labeled incorrect answers, (d) descriptions of different proficiency levels with the one or more topics of study and criteria for each proficiency level, (e) labeled examples of categorized topic feedback provided by instructors including at least positive feedback, negative feedback, and constructive criticism, and (e) past academic performance data for the learner including at least test scores, grade distribution, completion rates, difficulty ratings, or progress over time, and (ii) preparing the trained topic assessment LLM using the provided training dataset.

In some aspects, the techniques described herein relate to a method further including: preparing the learning recommendations LLM by: (i) providing, to the learning recommendations LLM, a training dataset comprising at least one of: (a) course materials, (b) academic performance data of the learner comprising at least past academic performance, previous courses taken, topics covered, test results, or an assignment performance, (c) feedback and assessment data including at least feedback on strengths, weaknesses, and areas for improvement for the learner or self-assessment data from the learner, and (d) demographic data of the learner comprising at least: age, education level, prior knowledge, or learning style, and (e) examples of personalized learning recommendations based on the course materials comprising at least sequences of topics, resources used, suggested readings, suggested exercises, and study plans, and (ii) preparing the learning recommendations LLM using the provided training dataset.

In some aspects, the techniques described herein relate to a method further including: preparing the learner performance assessment LLM by: (i) providing, to the learner performance assessment LLM, a training dataset comprising at least one of: (a) academic performance data of the learner linked to specific topics comprising at least past academic performance, previous courses taken, topics covered, test results, or an assignment performance, (b) interest data of the learner, (c) demographic data of the learner comprising at least: age, education level, prior knowledge, or learning style, and (d) descriptions of different proficiency levels for each topic of study and each area of interest and criteria for each proficiency level, (ii) preparing the learner performance assessment LLM using provided training dataset.

According to one aspect of the disclosure, a system is provided for assessing academic performance of a learner and providing learning recommendations for the learner, the system including: at least one memory; and at least one hardware processor coupled with the at least one memory and configured, individually or in combination, to: obtain assessment materials for a learner comprising at least: a plurality of test questions for an academic course taken by the learner, answers from the learner to the plurality of test questions, correct answers to the plurality of test questions, course materials, and past academic performance data for the course by the learner and one or more other courses completed by the learner in a program of study of the learner, wherein the test questions are directed to a plurality of topics of study covered by the course and one or more other courses completed by the learner within the program of study; analyze the answers using a trained test assessment LLM configured to check correctness of the answers against the correct test answers and to generate a test feedback indicating a level of proficiency with the test materials; analyze the test feedback using a trained course assessment LLM configured to evaluate a proficiency with the course materials based on the test feedback and to generate a course feedback comprising expected answers and indicating a level of proficiency with the course materials; analyze the course feedback using a trained topic assessment LLM configured to evaluate a proficiency with one or more topics of study based on the course feedback for given topics and the past academic performance data of the learner for the one or more other courses completed by the learner that cover the given topics, and to generate a topic feedback comprising a performance of the learner in other topics related to the course materials and a failure risk regarding the course materials; and, based on the topic feedback, generate, by a processor, and provide, via a user interface (UI), a plurality of personalized learning recommendations for one or more topics of study in which the learner has a level of proficiency below a proficiency threshold, wherein the plurality of personalized learning recommendations are based on the topic feedback.

In one exemplary aspect, a non-transitory computer-readable medium is provided storing a set of instructions thereon for assessing academic performance of a learner and providing learning recommendations for the learner, the system, including instructions for: obtaining assessment materials for a learner comprising at least: a plurality of test questions for an academic course taken by the learner, answers from the learner to the plurality of test questions, correct answers to the plurality of test questions, course materials, and past academic performance data for the course by the learner and one or more other courses completed by the learner in a program of study of the learner, wherein the test questions are directed to a plurality of topics of study covered by the course and one or more other courses completed by the learner within the program of study; analyzing the answers using a trained test assessment LLM configured to check correctness of the answers against the correct test answers and to generate a test feedback indicating a level of proficiency with the test materials; analyzing the test feedback using a trained course assessment LLM configured to evaluate a proficiency with the course materials based on the test feedback and to generate a course feedback comprising expected answers and indicating a level of proficiency with the course materials; analyzing the course feedback using a trained topic assessment LLM configured to evaluate a proficiency with one or more topics of study based on the course feedback for given topics and the past academic performance data of the learner for the one or more other courses completed by the learner that cover the given topics, and to generate a topic feedback comprising a performance of the learner in other topics related to the course materials and a failure risk regarding the course materials; and, based on the topic feedback, generating, by a processor, and providing, via a user interface (UI), a plurality of personalized learning recommendations for one or more topics of study in which the learner has a level of proficiency below a proficiency threshold, wherein the plurality of personalized learning recommendations are based on the topic feedback.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

Like reference numbers and designations in the various drawings indicate like elements.

DETAILED DESCRIPTION

Figure 1:
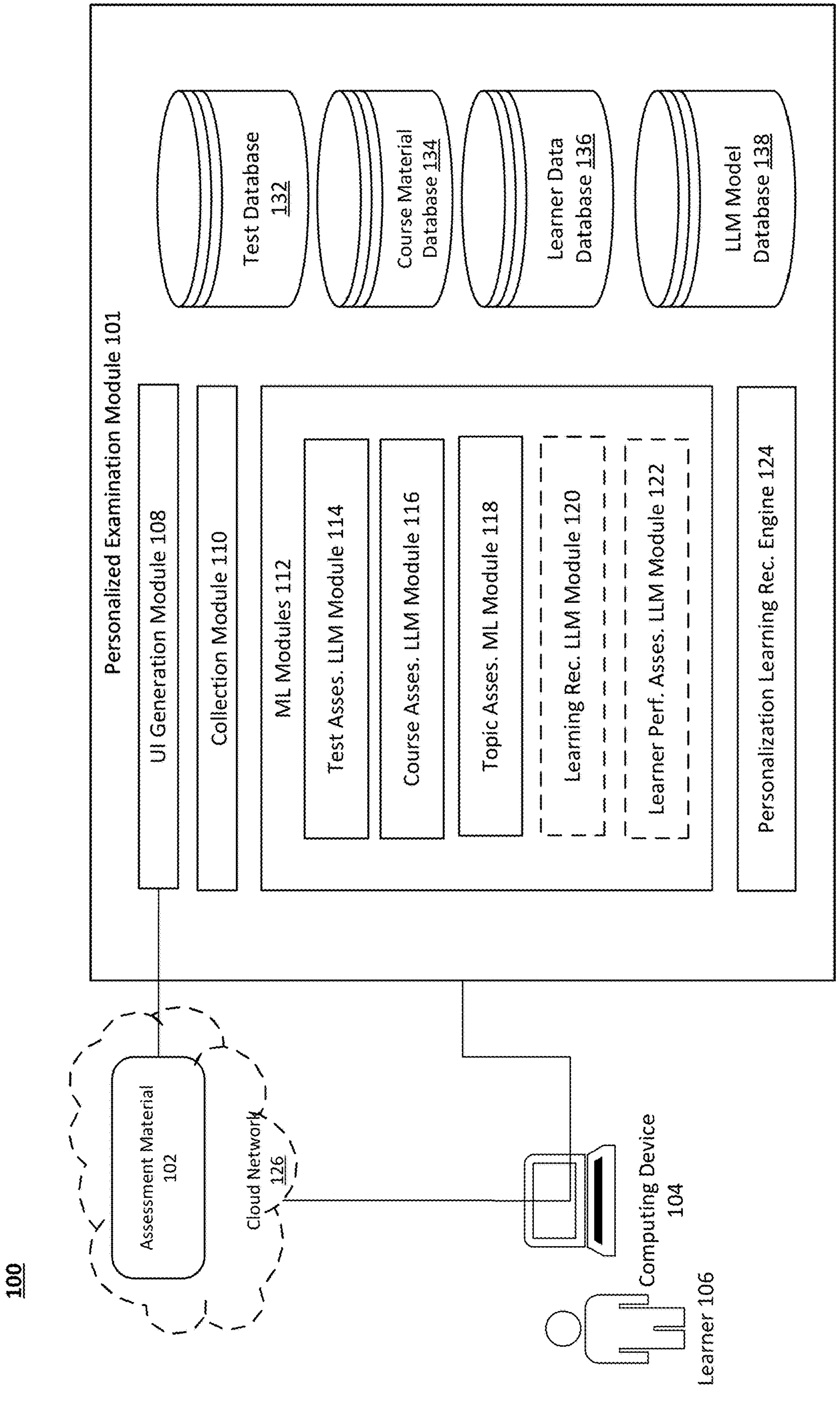
FIG. 1 is a block diagram illustrating a system for assessing academic performance of a learner and providing learning recommendations for the learner according to aspects of the present disclosure.

Exemplary aspects are described herein in the context of a system, method, and computer program product for assessing academic performance of a learner and providing learning recommendations for the learner. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Assessing the academic performance of a learner is essential for monitoring their learning progress and identifying areas where they may need additional support. Regular assessments allow educators to gauge how well learners are mastering key concepts and skills, which is critical for tailoring instruction to individual needs. This is especially important in today's diverse and dynamic classrooms, where learners often have varying levels of prior knowledge and learning styles. By evaluating academic performance, educators can ensure that all learners are on track to achieve the desired learning outcomes, fostering a more inclusive and effective educational environment.

Providing learning recommendations after a learner takes a test enhances the value of assessments by translating test results into actionable feedback. Instead of focusing solely on scores or grades, learning recommendations offer personalized strategies for improvement. These can include study techniques, additional resources, or targeted practice in specific areas where the learner may be struggling. This approach is a significant improvement over conventional methods that often focus on summative results without providing guidance for ongoing development. By offering constructive feedback, learners gain clear direction on how to improve, encouraging continuous learning and growth.

Technological advancements have further improved the effectiveness of both assessment and learning recommendations. Utilizing machine-learning based analysis and recommendations, for instance, can tailor assessments to a learner's individual proficiency level, providing a more accurate measure of their knowledge and skills. These automated systems can quickly analyze test results and generate detailed, personalized feedback, offering learners immediate insights into their performance. Compared to traditional methods that may rely on generalized feedback or take time to manually process, these technological tools allow for more precise, timely, and data-driven recommendations. By leveraging technology, educators can better support learners in their learning journeys, offering more specific and actionable guidance that leads to sustained academic improvement.

Accordingly, the present disclosure assesses academic performance and provides learning recommendations for a learner after the learner takes a test. One aspect involves analyzing a learner's answers to an online examination using a trained test assessment LLM configured to check correctness of the answers against the correct test answers and to generate a test feedback indicating a level of proficiency with the test materials. A second aspect involves analyzing the test feedback using a trained course assessment LLM configured to evaluate a proficiency with the course materials based on the test feedback and to generate a course feedback comprising expected answers and indicating a level of proficiency with the course material. A third aspect involves analyzing the course feedback using a trained topic assessment LLM configured to evaluate a proficiency with one or more topics of study based on the course feedback for given topics and the past academic performance data of the learner for the one or more other courses completed by the learner that cover the given topics, and to generate a topic feedback comprising a performance of the learner in other topics related to the course materials and a failure risk regarding the course materials. A fourth aspect involves generating and providing a plurality of personalized learning recommendations for one or more topics of study in which the learner has a level of proficiency below a proficiency threshold, wherein the plurality of personalized learning recommendations are based on the topic feedback.

Turning now to the figures, example aspects are depicted with reference to one or more components described herein, where components in dashed lines may be optional.

FIG. 1 is a block diagram illustrating a system 100 configured to proctor and score online examinations. In one aspect, the components of system 100 may be implemented on computer systems, such as that shown in FIG. 5.

The system 100 may be used to assess academic performance of a learner 106 and providing learning recommendations for the learner. The personalized examination module 101 is configured to analyze a learner's examination results and generate personalized learning recommendations for the learner based on the learner's examination results, course materials, past academic performance data, and course history. In addition, personalized examination module 101 is configured to generate scores indicating a level of proficiency with one or more topics of study based on the overall academic performance of the learner and course history of the learner. This provides a way to implement a personalized learning recommendation for multiple topics of learners in which the learner has a level of proficiency below a predefined threshold. The final stage of the process is delivering personalized feedback to the learner 106 based on the personalized learning recommendations. The feedback may include an overview of their performance on the test, highlighting both strengths and areas for improvement. It would also provide actionable guidance, such as revisiting specific course materials, practicing certain problem types, or engaging in supplemental activities. This feedback is designed to be constructive, helping the learner focus on areas that need attention while reinforcing their understanding of the topics they have mastered. In this way, the personalized examination module 101 can quickly analyze test results and generate detailed, personalized learning recommendations and feedback, offering learners a holistic and immediate insights into their performance.

The system 100 includes at least assessment material 102, a computing device 104, and a personalized examination module 101. The personalized examination module 101 may be configured to process and generate learning recommendations for a learner based on a learner's examination results, course material, a learner's academic history, and course history. The computing device 104 allows the learner 106 to take an examination and also view their examination results and recommendations. The computing device 104 may execute a plurality of modules in the personalized examination module 101 that together make up the collection, analysis, and recommendation system. In some aspects, the personalized examination module 101 may correspond to the computing device 104 or cloud network 126 that is configured to execute a plurality of modules that together make up the personalized examination module 101 for evaluating the examination containing questions directed to a plurality of topics of study covered by a course and other courses completed by the learner 106 within a program of study.

In some aspects, the personalized examination module 101 may include a user interface generation module 108, a collection module 110, a machine learning (ML) module 112 including at least a test assessment LLM module 114, a course assessment LLM module 116, a topic assessment ML module 118, an optional learning recommendation LLM module 120, and an optional learner performance assessment LLM module 122, a personalized learning recommendation engine 124, a test database 132, a course material database 134, a learner data database 136, and a LLM model database 138.

The computing device 104 may execute a UI generation module 108 to implement a UI for display on the computing device 104 that is configured to receive input from the computing device 104, administer the online examination to the learner 106, and optionally display examination results and personalized learning recommendations for the learner 106. In some aspects, the UI generation module 108 generates a single UI and layout and components of the UI elements (e.g., menus, buttons, forms, grids, etc.) based on predefined rules, data models, or templates. In some aspects, the UI generation module 108 may also be configured to automatically adjust the UI elements based on the content or data that it needs to display such as adapting a form to input fields or displaying a list of items. In some aspects, the UI generation module 108 may also be configured to adapt the UI to different screen sizes and resolutions by making sure that the UI works well across various devices.

The computing device 104 may execute a collection module 110 that collects and obtains assessment data from the learner 106 in order to evaluate an examination and generate the learning recommendation and feedback. In some aspects, portions of the assessment material 102 may be stored on a local computing device. In some aspects, portions of the assessment material 102 may be stored on a cloud network 126. The assessment material 102 may include at least one of a plurality of test questions for an academic course taken by the learner 106, answers from the learner 106 to the plurality of test questions, correct answers to the plurality of test questions, course materials, and past academic performance data for the course by the learner 106 and one or more other courses completed by the learner 106 in the program of study of the learner 106. In some aspects, the assessment by the personalized examination module 101 may begin with a set of test questions for the academic course. The learner's responses to these questions are collected and compared against the correct answers. This comparison allows the system or educator to identify which questions the learner 106 answered correctly and which were incorrect, creating a baseline for performance measurement.

In some aspects, the assessment materials may correspond to Learning Management System (LMS) data. The LMS is a software platform that helps educators manage, deliver, and track educational content and training programs. It acts as a central hub for creating, distributing, and organizing learning materials, assignments, assessments, and communications for both in-person and online learning environments. With an LMS, instructors can create courses, upload content (like readings, videos, or quizzes), and manage assignments, grades, and attendance all in one place. Learners can access their course materials, submit assignments, take quizzes, engage in discussions, and receive feedback directly within the system. LMS platforms are widely used by educational institutions, corporations, and organizations for both formal education and professional training, as they provide a scalable way to deliver personalized learning experiences and track learner progress effectively.

The LMS data may be categorized broadly based on the various functions and interactions that take place within the LMS. The LMS data may include course data that includes information about courses such as course titles, descriptions, syllabus details, instructional content (documents, videos, quizzes), learning modules, and activities. It also includes course duration, structure, and related resources used by learners and instructors. LMS data may include learning progress data that captures learners'progress through their courses. It includes information about course completion rates, progress tracking, assignments submitted, quiz scores, badges earned, and time spent on different sections or lessons. Learning progress data helps instructors assess how well learners are following along and identify areas where additional support might be needed. LMS data may include assessment data comprises all the information related to evaluations, such as quiz and test scores, feedback on assignments, participation in assessments, and grades. It also includes performance trends over time and proficiency scores in specific topics. LMS data may also include engagement data measures how actively learners participate within the LMS environment. This can include metrics such as login frequency, participation in discussion forums, completion of activities, and engagement with course content (e.g., clicks on videos, frequency of accessing reading materials). LMS data may also include behavioral data records learners'interactions with the LMS, such as login timestamps, clicks, navigation behavior, time spent on different resources, and sequences of actions taken. This data helps to understand usage patterns, and identify potential roadblocks or opportunities for improving the learning experience.

LMS data may also include Feedback data refers to any comments, surveys, or ratings submitted by learners regarding courses or the overall learning experience. It includes instructor feedback provided to learners on assignments or exams as well. LMS data may also include completion data that involves data on course outcomes, such as completed modules, final grades, earned certifications, and dropout rates. Completion data provides insights into learner success and course effectiveness. LMS data may also include attendance data that indicates who attended, how often learners join live lectures or webinars, and any participation rates in live components of the learning. LMS data may also include learning paths and recommendations that reflect personalized paths assigned to different learners, which might include prerequisites completed, courses recommended, suggested resources, and individualized learning plans.

All of the LMS data helps provide valuable insights for instructors, learners, and administrators. By analyzing these types of data, stakeholders can assess the effectiveness of learning experiences, improve instructional quality, personalize learning paths, and provide timely support to enhance educational outcomes.

The computing device 104 may execute a ML module 112 including at least a test assessment LLM module 114, a course assessment LLM module 116, a topic assessment ML module 118, an optional learning recommendation LLM module 120, and an optional learner performance assessment LLM module 122.

A LLM is an advanced artificial intelligence system designed to understand and generate human-like text. These models are trained on vast amounts of data, enabling them to comprehend context, recognize patterns, and produce coherent and contextually relevant responses. LLMs are utilized in various applications, including chatbots, content creation, and language translation. Their ability to process and generate natural language makes them powerful tools for enhancing communication and automating tasks that require language understanding. However, the LLM modules must first go through preparing (e.g., training, retraining, distillation, fine-tuning, etc.) to teach each LLM model to perform their respective specific tasks. As a nonlimiting example, the LLM models may incorporate one of the machine learning models listed below.

A transformer is a deep learning architecture used in large language models (LLMs). The transformer has an encoder/decoder structure with numerous stacked multi-head attention layers and feed forward network layers. This architecture allows the model to process and generate text effectively, capturing long-range dependencies and contextual information. Transformer are well-suited for tasks like natural language processing, and image classification and generation. Common examples of transformer models are generative pre-trained transformer (GPT) and Bidirectional Encoder Representations from Transformers (BERT).

A classification model is a type of machine learning model that is designed to predict the category or class to which a given data point belongs to. The classification model works by analyzing input features and assigning them to one of several predefined labels. These models are trained on labeled data, where the correct category is known, and they learn patterns that allow them to make predictions on new, unseen data. Examples of classification models include at least a regression model used for binary classification, a decision tree used to predict class by splitting data based on feature values, support vector machine (SVM) configured to perform classification by finding the best boundary between classes, and neural networks.

In some examples, the ML module 112 may comprise one or more neural networks, which are a class of machine learning models inspired by the structure and functioning of the human brain. They consist of interconnected nodes, called neurons or artificial neurons, organized into layers. Neural networks are capable of learning complex patterns and representations from data. The neural network executed by the machine learning module 112 may be one of the following: transformer neural network, convolution neural network (CNN), recurrent neural network (RNN), long short-term memory (LSTM) network, gated recurrent unit (GRU) network, autoencoder, generative adversarial network (GAN).

An autoencoder is a type of neural network used for unsupervised learning and dimensionality reduction, and consists of an encoder that compresses input data into a lower-dimensional representation (encoding) and a decoder that reconstructs the original input from the encoding.

For analysis tasks such as analyzing answers to check correctness against an answer key (or grading rubric) or generating a course feedback, an untrained test assessment LLM in the test assessment LLM module 114 will first analyze data from a training set to "learn" the correct answers and generate a test feedback indicating a level of proficiency with the test materials. As an example, the training dataset may include at least: a plurality of test questions; a plurality of graded answers corresponding to the plurality of test questions indicating at least labeled correct answers, labeled partially correct answers, labeled incorrect answers, or explanation from the course materials, and a plurality of scoring criteria corresponding to how a score is assigned, including: assigning different weights for at least conceptual understanding, accuracy, clarity, organization, style, or completeness; descriptions of different proficiency levels with the test materials and criteria for each proficiency level, and labeled examples of test feedback provided by instructors including at least positive feedback, negative feedback, and constructive criticism.

During training of the test assessment LLM module 114, the training dataset will comprise data corresponding to test questions, graded answers, or scoring criteria that are input through the untrained LLM In the test assessment LLM module 114. The results from the untrained LLM are then compared with known data set results using the corresponding labels identifying the learner's answers as correct, partially correct, or incorrect answers. It should be noted that the input to the trained LLM in the test assessment LLM module 114 will be data from the training dataset.

For every input training sample from the training dataset, the trained LLM from the test assessment LLM module 114 will produce a prediction consisting of values representing a probability that a particular answer is correct, partially correct, or incorrect answers. The output with the highest probability determines the predicted grading for the answer. A class label for each answer may be used to compute a loss (e.g., loss function).

The trained LLM from the test assessment LLM module 114 then uses a loss function that quantifies the error between the predicted output and the ground truth for a given training sample. In other words, the loss function can be used to guide the learning process by updating the network weights in a way that improves the accuracy of future predictions. This process may continue until the difference between the prediction and the correct targets is minimal. In some examples, an appropriate loss function, such as Mean Squared Error (MSE) for regression tasks (e.g., predicting brightness levels) or a Cross-Entropy Loss for classification tasks (e.g., detecting specific color changes).

Once the LLM is trained (e.g., inference), the trained LLM from the test assessment LLM module 114 may evaluate the answers for accuracy by comparing them with the correct test answers and generate a test feedback that indicates a level of proficiency with the test materials.

During inference, the trained LLM from the test assessment LLM module 114 does not re-evaluate or adjust the layers of the neural network based on the results. Instead, the inference applies knowledge from the trained neural network and uses it to infer a result (e.g., correct, partially correct, or incorrect). Accordingly, when a new unknown dataset (e.g., answers from an examination) is input through the trained neural network in the trained LLM of the test assessment LLM module 114, the trained LLM outputs a prediction of an accuracy of the learner's answer on the examination as based on predictive accuracy of the LLM.

Similarly, during preparation (e.g., training) of the LLM in the course assessment LLM module 116, the training dataset will include training including at least one of: course material; a plurality of test questions; a plurality of graded test data corresponding to the test questions indicating at least labeled correct answers, labeled partially correct answers, or labeled incorrect answers; descriptions of different proficiency levels with the course material and criteria for each level; labeled examples of categorized course feedback provided by instructors including at least positive feedback, negative feedback, and constructive criticism; and historical course feedback summary comprising at least connections between the test feedback and overall course feedback. In some aspects, analyzing the test feedback may further include using a handbook comprising expected answers configured to enhance feedback based on achieving assessment criteria. It should be noted that the input to the course assessment LLM module 116 will be data from the training dataset.

For every input training sample from the training dataset, the trained LLM from the course assessment LLM module 116 will produce a prediction consisting of values representing a probability corresponding to an evaluation of a proficiency with the course material based on the test feedback from the trained test assessment LLM module 114. The output with the highest probability determines the generated course feedback comprising expected answers and indicating a level of proficiency with the course material for the learner 106. A class label for the test feedback is used to compute a loss (e.g., loss function).

Similar to the trained test assessment LLM module 114, the trained LLM from the course assessment LLM module 116 then uses a loss function that quantifies the error between the predicted output and the ground truth for a given training sample. In other words, the loss function can be used to guide the learning process by updating the network weights in a way that improves the accuracy of future predictions. This process may continue until the difference between the prediction and the correct targets is minimal. In some examples, an appropriate loss function, such as Mean Squared Error (MSE) for regression tasks (e.g., predicting brightness levels) or a Cross-Entropy Loss for classification tasks (e.g., detecting specific color changes).

Once the LLM is trained (e.g., inference), the trained LLM from the test assessment LLM module 114 may evaluate a proficiency with the course materials based on the test feedback and generate a course feedback comprising expected answers and indicating a level of proficiency with the course materials.

During inference, the trained neural network model from the test assessment LLM module 114 does not re-evaluate or adjust the layers of the LLM based on the results. Instead, the inference applies knowledge from the trained LLM and uses it to generate an evaluation (e.g., course feedback comprising expected answers) and course feedback. Accordingly, when a new unknown dataset (e.g., test feedback) is input through the trained LLM in the test assessment LLM module 114, the trained LLM outputs a prediction of a proficiency with the course materials based on the test feedback and a course feedback comprising expected answers and indicating a level of proficiency with the course materials.

Furthermore, during training of the trained topic assessment ML, the training dataset will include training data including at least: course material; a plurality of test questions; a plurality of graded test data corresponding to the plurality of test questions indicating at least labeled correct answers, labeled partially correct answers, or labeled incorrect answers; descriptions of different proficiency levels with the one or more topics of study and criteria for each proficiency level; labeled examples of categorized topic feedback provided by instructors including at least positive feedback, negative feedback, and constructive criticism; and past academic performance data for the learner including at least test scores, grade distribution, completion rates, difficulty ratings, or progress over time. In some aspects, the trained topic assessment ML comprises one or more of: a classification model, a regression classification model, an autoencoder neural network, or a neural network model.

Optionally, during training of the LLM from the optional learning recommendations LLM module 120, the training dataset will include training data including a least one of: course material, learner performance data, learning objectives, learner goals set according to a learner track or major, learner profiles, feedback/evaluation, and supplementary resources. By integrating this diverse and comprehensive training dataset, the LLM can learn to generate personalized learning recommendations based at least in part on the course materials. In this way, the optional learning recommendation will adjust recommendations to not only learning objectives (which is normally part of a course), but to an individual's own academic and personal goals, which is much broader than learning objectives related to the course.

Optionally, during training of the LLM from the optional learner performance assessment LLM module 122, the training dataset will include training data including at least one of: academic performance data, course content/objectives, learner interests, peer performance data, feedback/evaluation data, and proficiency scoring criteria. In this way, the trained LLM from the optional learner performance assessment LLM module 122 can learn to evaluate an overall academic performance of the learner within the program of study and proficiency with one or more topics of study and areas of interests, and to generate a score of proficiency for each topic of study and each area of interest.

In some aspects, an optimizer such as Adam or SGD may be used to train the models in the test assessment LLM module 114, the course assessment LLM module 116, the topic assessment ML module 118, the optional learning recommendation LLM module 120, and the optional learner performance assessment LLM module 122. In some aspects, the data may be split into training, validation, and test sets. In these aspects, the models from the test assessment LLM module 114, the course assessment LLM module 116, the topic assessment ML module 118, the optional learning recommendation LLM module 120, and the optional learner performance assessment LLM module 122 are trained on the training dataset and then validated by the validation sets in order to tune hyperparameters.

The computing device 104 may execute a personalization learning recommendation engine 124. Using the data from the test results, course materials, and past academic performance, a personalized learning recommendation is generated. These recommendations are tailored to address the learner's specific needs. For example, if a learner consistently struggles with a particular topic, the system might suggest targeted practice problems, tutoring sessions, or additional reading from the course materials. It may also recommend new learning strategies or study techniques based on past performance.

It should be noted that the evaluation of examination results and generation of course feedback and personalized learning recommendations described in the present disclosure are heavily simplified. One skilled in the art will appreciate that the LLMs utilized may have significantly large datasets with highly specific details. For example, the examination may include "open-ended" questions and there may be subtle difference between an expected answer or answer rubric and the learner's response. As another example, the present disclosure may also consider an entire breadth of a learner's course history, previous performance results including past examinations or homework assignments, a learner's coursework history, and/or learner's interest. This type of analysis would be beyond the capabilities of the huma mind because the amount of data to be identified, considered, and processed when grading a learner is unfathomable.

It should also be noted that although the present disclosure is described in terms of evaluation examinations for illustrative purposes only, methods and systems described in the present disclosure can be applied to any type of coursework, assignment, quiz, or the like.

Figure 2:
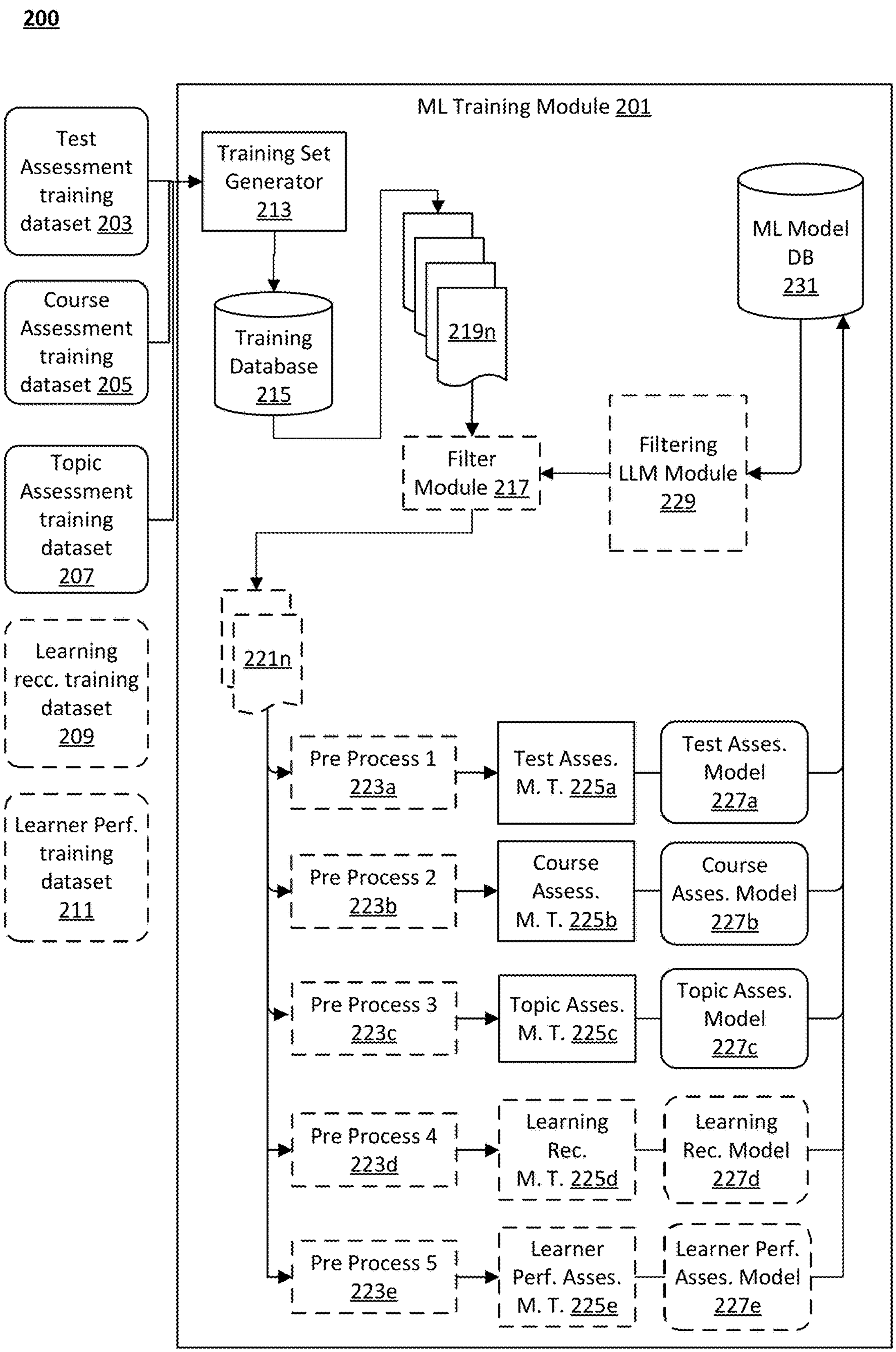
FIG. 2 is a block diagram illustrating a system for preparing machine learning models to assess academic performance of a learner and provide learning recommendations according to aspects of the present disclosure.

FIG. 2 is a block diagram illustrating a system for preparing machine learning models to assess academic performance of a learner and provide learning recommendations for the learner according to aspects of the present disclosure. As shown in example 200, a ML training module 201 is configured to build and train specialized machine learning models with inference to perform particular tasks. This enables the specialized machine learning models to develop an ability to perform particular objectives on inputs that are not part of a training dataset. By subjecting the specialized machine learning models to large amounts of unlabeled and/or labeled training data sets, the specialized machine learning models may perform particular tasks such as checking correctness of the answers against the correct test answers and generating a test feedback indicating a level of proficiency with the test materials.

Supervised learning is effective for tasks such as classification (assigning inputs to predefined categories) and regression (predicting continuous values) since it relies on the availability of labeled data for both training and evaluation phases. In supervised learning, the ML training module 201 trains the algorithm on a labeled dataset, where each input has a corresponding output. The goal is to learn a mapping function from inputs to outputs, allowing the algorithm to make predictions or classifications on new, unseen data. The process typically involves the following steps: training, model building, prediction, feedback, and adjustment. In the training phase, the ML training module 201 provides the algorithm with a training dataset including input-output pairs. The algorithm learns the mapping function that relates inputs to outputs through an iterative process, adjusting its internal parameters based on the provided examples.

During model building, the algorithm creates a model that can generalize from the training data to make predictions on new, unseen data. The model's complexity varies based on the algorithm used. For example, the model may be a simple linear regression model or a complex neural network. During the prediction phase, the ML training module 201 inputs test inputs (i.e., inputs with known outputs) into the model, which generates predictions or classifications based on what it has learned during training. The accuracy of predictions is evaluated by comparing them to the known outputs in a validation or test dataset. During the feedback and adjustment phase, machine refines the model based on feedback from its predictions. If the predictions differ from the actual outputs, the algorithm adjusts its internal parameters to minimize the errors. The performance of the trained model is assessed using metrics such as accuracy, precision, recall, etc., depending on the nature of the problem.

In some aspects, the ML training module 201 includes at least a training database 215 configured to store the raw training data 219*n* and corresponding labels, a ML model database 231 to store the trained models (e.g., test assessment model 227*a*, course assessment model 227*b*, topic assessment model 227*c*, an optional learning recommendation model 227*d*, and/or an optional learner performance model 227*e*). In some aspects, the ML training module 201 may include an optional filtering machine learning model 229 and an optional filter module 217 configured to filter data from the training database 215 for training by removing poorly generated training data.

Training data from the test assessment training dataset 203, course assessment training dataset 205, topic assessment training dataset 207, optional learning recommendation training dataset 209, and the optional learner performance dataset 211 is received into the ML training module 201 via the training set generator 213. Details about the data included in each training dataset is described in more detail above with FIG. 1.

An optional filter module 229 is configured to filter out bad training images and/or data in order to clean up the training data in the training dataset 219*n*. In some examples, the optional filter module 217 may be a neural network. In some examples, the optional filter module 217 is a mathematical model. In some examples, the cleaned training dataset 221*n* then undergoes optional preprocessing steps depending on which neural network or model is being trained.

The optional preprocess 1 223*a*, preprocess 2 223*b*, preprocess 3 223*c*, preprocess 4 223*e*, and preprocess 5 223*e* are automated processes that modify the raw data received from 219*n* (or cleaned training dataset 221*n*) and prepare the raw data as input to the respective model trainers (e.g., test assessment model trainer 225*a*, course assessment model trainer 225*b*, topic assessment model trainer 225*c*, learning recommendation model trainer 225*d*, or learner performance assessment model trainer 225*e*). These may be described in the ML training module 201 as snippets of code that prepares the datasets. In some examples, the preprocessing module (e.g., preprocess 1 223*a*, preprocess 2 223*b*, preprocess 3 223*c*, preprocess 4 223*d*, and preprocess 5 223*e*) for a particular trainer may be an automated script or code that will be setup the first time any model is trained.

The test assessment model trainer 225*a*, course assessment model trainer 225*b*, topic assessment model trainer 225*c*, learning recommendation model trainer 225*d*, or learner performance assessment model trainer 225*e* are the scripts or code that train the respective models. The test assessment model trainer 225*a*, course assessment model trainer 225*b*, topic assessment model trainer 225*c*, learning recommendation model trainer 225*d*, or learner performance assessment model trainer 225*e* may be a script or code that holds the instructions on how a model should be trained (e.g., optimization method, model architecture, dataset division, etc.) and also runs the training. The test assessment model trainer 225*a*, course assessment model trainer 225*b*, topic assessment model trainer 225*c*, learning recommendation model trainer 225*d*, or learner performance assessment model trainer 225*e* each take as input the raw or filtered processed training data and train the test assessment model 227*a*, the course assessment model 227*b*, the topic assessment model 227*c*, the optional learning recommendation model 227*d*, and the optional learner performance assessment model 227*e* to achieve their specific objectives, respectively.

In summary, the raw dataset 219 or cleaned dataset 221*n* may optionally go through different preprocessing steps 223*a*, 223*b*, 223*c*, 223*d*, 223*e* and then a corresponding test assessment model trainer 225*a*, course assessment model trainer 225*b*, topic assessment model trainer 225*c*, learning recommendation model trainer 225*d*, or learner performance assessment model trainer 225*e* to generate a trained test assessment model 227*a*, course assessment model 227*b*, topic assessment model 227*c*, optional learning recommendation model 227*d*, and optional learner performance assessment model 227*e*. In some examples, each of these models may be a LLM or a neural network.

As a non-limiting example and as discussed above, the machine learning may be a neural network. The neural network models are designed using a set of hyperparameters that define high-level aspects of their architecture and training process. These hyperparameters include, but are not limited to a combination of architecture type, number of layers, memory size, number of attention heads, learning rate, batch size, optimization algorithm, and the like. Based on these hyperparameters, learnable variables called parameters are initialized, which define the mathematical function that the neural network represents.

The raw training dataset 219*n* used for training may include noise and bad training images from the training database 215. Accordingly, to create a clean and filtered training dataset, the optional filter module 217 is configured to filter out unwanted data points from the raw training dataset 219*n* by developing smaller, less accurate systems based on patterns and metadata information.

During the training process, the test assessment model trainer 225*a*, the course assessment model trainer 225*b*, the topic assessment model trainer 225*c*, the optional learning recommendation model trainer 225*d*, or the optional learner performance assessment model trainer 225*e* are presented with input data and labels of actual values, and the optimization objective, which aims to minimize the difference between the actual value and the predicted value, is calculated. The optimization algorithm updates the parameters of the test assessment model trainer 225*a*, the course assessment model trainer 225*b*, the topic assessment model trainer 225*c*, the optional learning recommendation model trainer 225*d*, or the optional learner performance assessment model trainer 225*e* to reduce the value of the objective. This process is repeated for several iterations until the parameters do not change anymore. This process is repeated for various combinations of hyperparameters, and the model with the smallest label prediction error is selected as the final model.

When a new model (e.g., trained test assessment model 227*a*, course assessment model 227*b*, topic assessment model 227*c*, optional learning recommendation model 227*d*, and optional learner performance assessment model 227*e*) is created, and a new process for filtering and automated labeling is established, it is added to the ML model database 231 in the ML training module 201. This enables the new model to be part of the closed-loop model update process. Optionally, at regular intervals, data which is continuously collected can be filtered, labeled, and used to update old models by an optional filtering machine learning module 229. In some examples, the optional filtering machine learning module 229 is a neural network. In some examples, the optional filtering machine learning module 229 is a mathematical model. This approach may capture changes in the data over time.

Figure 3:
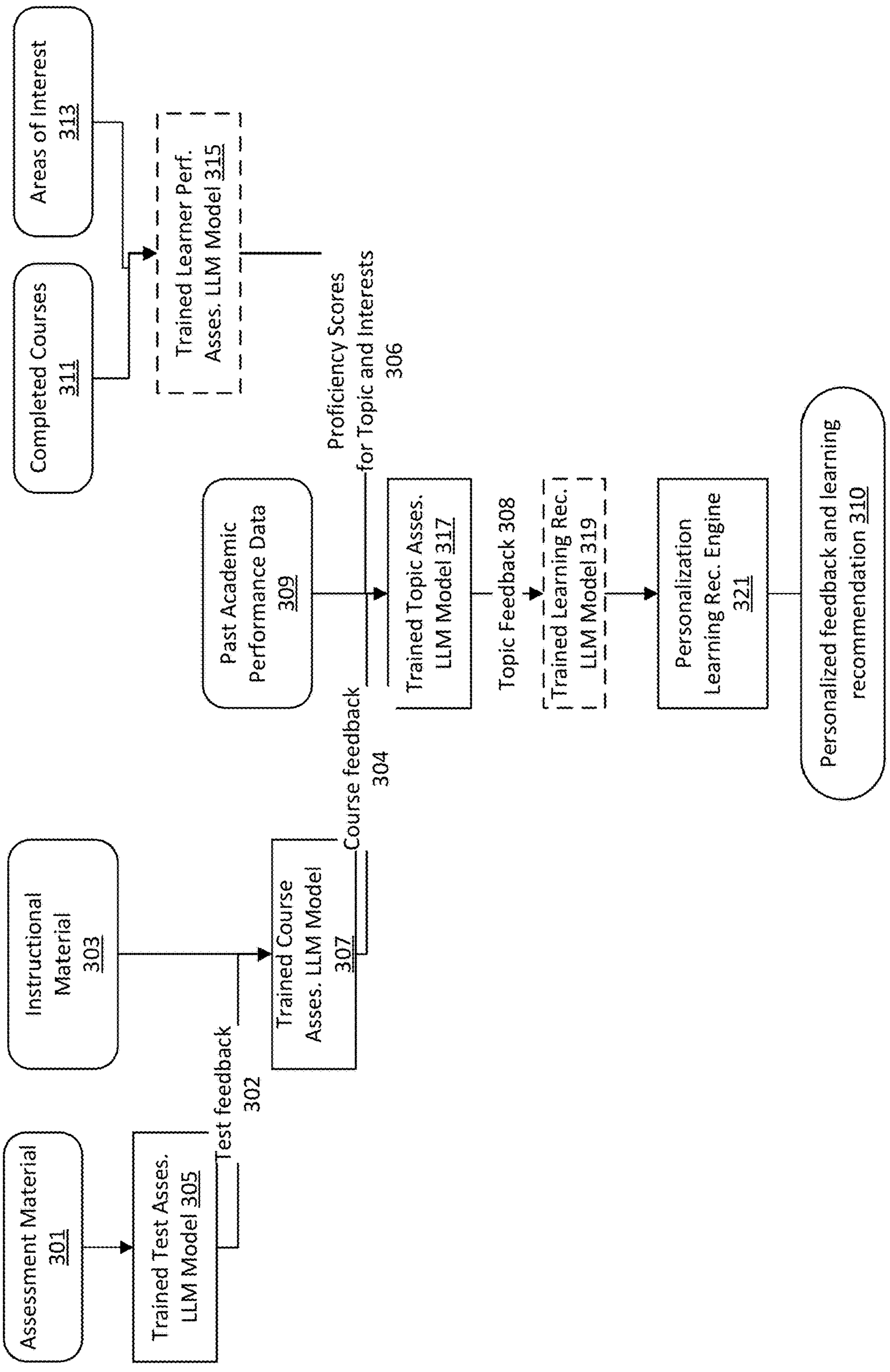
FIG. 3 is an example method for providing personalized feedback and learning recommendations according to an aspect of the present disclosure.

FIG. 3 is an example method for providing personalized feedback and learning recommendations according to an aspect of the present disclosure.

The method 300 begins by inputting assessment material 301 (e.g., test results or assessment material 102 from FIG. 1) into a trained test assessment LLM model 305 (e.g., the test assessment LLM module 114 from FIG. 1 or the test assessment model 227*a* from FIG. 2) to generate a test feedback 302. The trained course assessment LLM model 307 (e.g., course assessment LLM module 116 from FIG. 1 or course assessment model 227*b* from FIG. 2) obtains the test feedback 302 and instructional material 303 and generates course feedback 304.

The trained learner performance assessment LLM model 315 (e.g., the topic assessment ML module 118 from FIG. 1 or the topic assessment model 227*c* from FIG. 2) obtains completed sources 311 for a learner and areas of interest 313 of the learner to generate proficiency scores for topics and interests 306.

The trained topic assessment LLM model 317 (e.g., the topic assessment ML module 118 from FIG. 1 or the topic assessment model 227*c* from FIG. 2) obtains the course feedback 304, the past academic performance data 309, and the proficiency scores for topics and interest 306 to generate topic feedback 308.

The optional trained learning recommendation LLM model 319 (e.g., the optional learning recommendation LLM module 120 from FIG. 1 or the optional learning recommendation model 227*d* from FIG. 2) obtains the topic feedback 308 and transmits the topic feedback 308 to the personalization learning recommendation engine 321 (e.g., the personalization learning recommendation engine 124 shown in FIG. 1) for generating personalized feedback and learning recommendation 310.

Figure 4:
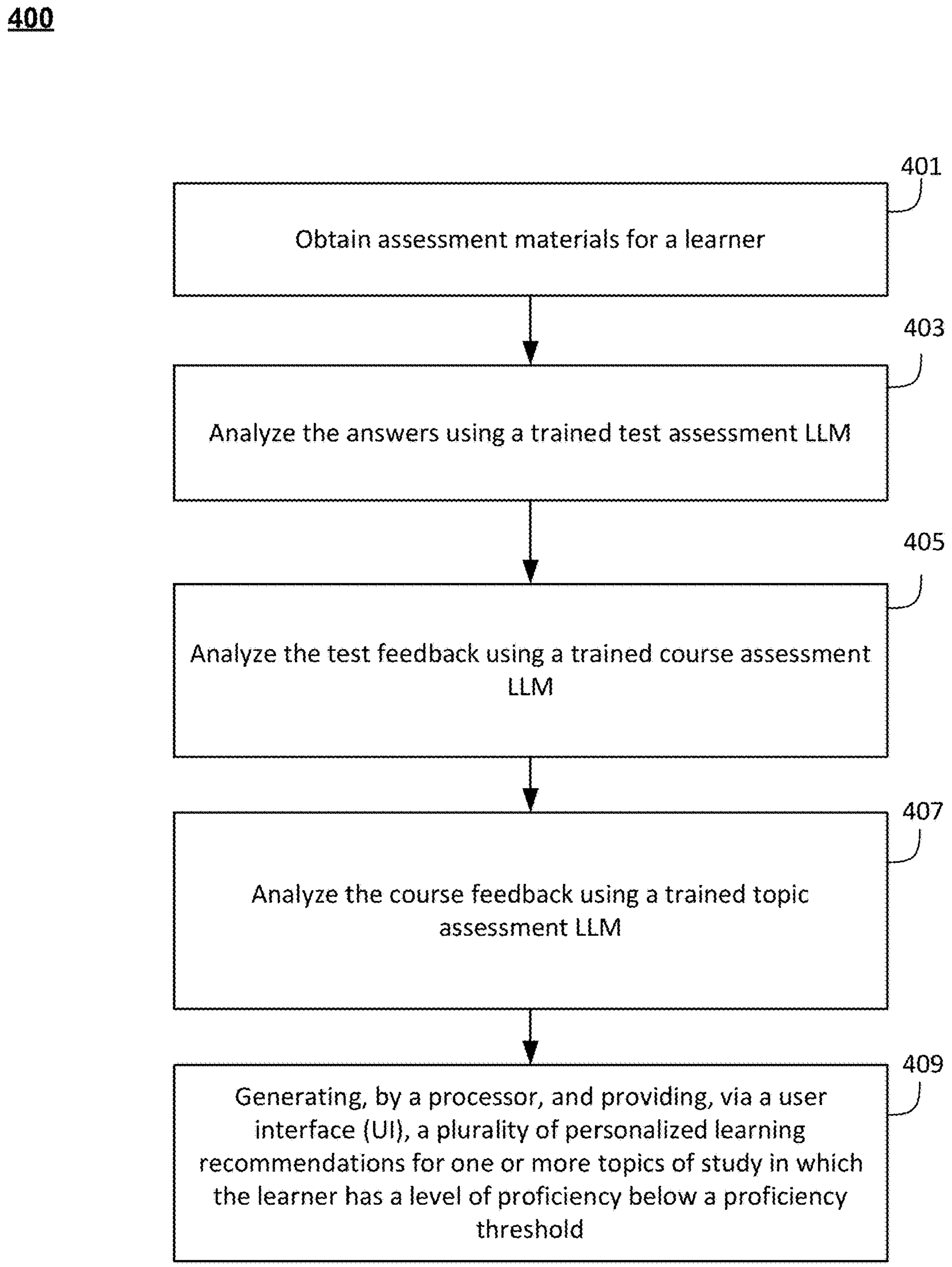
FIG. 4 is an example method for assessing academic performance of a learner and providing learning recommendations according to aspects of the present disclosure.

FIG. 4 is an example method for assessing academic performance of a learner and providing learning recommendations according to aspects of the present disclosure. In various implementations, the method 400 is performed by a device with one or more processors and non-transitory memory that performs intent prediction. In some implementations, the method 400 is performed by processing logic, including hardware, firmware, software, or a combination thereof. In some implementations, the method 400 is performed by a processor executing code stored in a non-transitory computer-readable medium (e.g., a memory). The method 400 describes a method for assessing academic performance of a learner and providing learning recommendations for the learner.

At 401, the method 400 may include obtaining assessment materials for a learner comprising at least: a plurality of test questions for an academic course taken by the learner, answers from the learner to the plurality of test questions, correct answers to the plurality of test questions, course materials, and past academic performance data for the course by the learner and one or more other courses completed by the learner in a program of study of the learner. In some aspects, the test questions may be directed to a plurality of topics of study covered by the course and one or more other courses completed by the learner within the program of study.

At 403, the method 400 may include analyzing the answers using a trained test assessment LLM configured to check correctness of the answers against the correct test answers and to generate a test feedback indicating a level of proficiency with the test materials.

Analyzing answers to an examination of the learner using the trained test assessment LLM is crucial for ensuring the accuracy of responses and for providing meaningful test feedback. By comparing a learner's answers against the correct test responses, the trained test assessment LLM can evaluate correctness efficiently and consistently. In addition, the examination may be an open ended question (e.g., as opposed to a multiple choice) or prompt such that the trained test assessment LLM is trained to grade the open-ended question or prompt by evaluating the response based on criteria such as relevance, completeness, coherence, and accuracy of the information. The process begins by comparing the learner's response against a range of possible high-quality answers, which can be derived from training data or from a specific rubric provided by the instructor. The trained test assessment LLM assesses how well the response aligns with key concepts and expected ideas, whether it addresses all parts of the question, and if it demonstrates a logical and well-structured argument or explanation.

In addition, the trained test assessment LLM may also consider contextual clues, grammar, and clarity of expression to evaluate the overall quality of the response. For example, the trained test assessment LLM may assign a grade based on the matching score to an ideal answer or rubric, making use of probabilistic analysis to determine if the learner's answer falls within an acceptable range of correctness or completeness. Additionally, the trained test assessment LLM can provide constructive feedback by highlighting strengths and weaknesses in the answer, offering insights that help guide the learner's improvement. This assessment, while not perfectly identical to human judgment, offers a scalable, efficient way to evaluate responses in a consistent manner.

Moreover, the trained test assessment LLM generates test feedback that indicates the learner's level of proficiency with the test material. This approach helps identify areas of strength and pinpoint specific gaps in understanding, making it a powerful tool for guiding targeted learning and improvement. Ultimately, it offers a data-driven method to support both educators and learners in achieving better educational outcomes.

At 405, the method 400 may include analyzing the test feedback using a trained course assessment LLM configured to evaluate a proficiency with the course materials based on the test feedback and to generate a course feedback comprising expected answers and indicating a level of proficiency with the course materials. In some aspects, analyzing the test feedback using the trained course assessment LLM may include using a handbook comprising expected answers configured to enhance feedback based on achieving assessment criteria.

Analyzing the test feedback using a trained course assessment LLM is vital for accurately evaluating a learner's proficiency with the course materials and ensuring comprehensive learning. By examining the learner's performance across a test and understanding the patterns in their responses, the trained course assessment LLM can provide a detailed assessment of their strengths and areas for improvement. The trained course assessment LLM (e.g., the course assessment LLM module 116 shown in FIG. 1) not only evaluates the learner's proficiency based on the correctness and depth of their answers but also generates course feedback that includes expected answers for better understanding. This feedback helps learners align their understanding with course expectations and gives them a clear sense of their progress, indicating their level of proficiency with the material. Such detailed, targeted feedback enables learners to focus on gaps in their knowledge, driving more personalized and effective learning experiences.

In some aspects, the method 400 may include obtaining time-series data corresponding to user engagement with a system configured to facilitate the plurality of test questions for the academic course. The time-series data may include at least one of click data or engagement metrics with content from the course. Evaluating the proficiency with the one or more topics of study and generating the topic feedback may be based on analyzing the time-series data configured to provide insight into behavioral patterns of the learner—particularly, the learner's level of engagement with course materials.

In some aspects, the method 400 may include: collecting past academic performance data of the learner for the course and one or more other courses completed by the learner in the program of study for the learner; collecting data about areas of interests of the learner related to the program of study; analyzing the collected data using a trained learner performance assessment LLM (e.g., the optional learner performance assessment LLM module 122 shown in FIG. 1) configured to evaluate an overall academic performance of the learner within the program of study and proficiency with one or more topics of study and areas of interests, and to generate a score of proficiency for each topic of study and each area of interest; and providing the generated scores to the trained topic assessment LLM for generating the topic feedback indicating a level of proficiency with one or more topics of study.

Past academic performance data of the learner, including records from the current course, other completed courses, and areas of interest related to the program of study, is helpful for evaluating overall academic performance and proficiency in various topics. This historical data provides a comprehensive view of the learner's learning journey, highlighting patterns in their understanding, areas of strength, and persistent challenges. By analyzing performance across different but related courses, it becomes possible to identify overarching competencies and knowledge gaps that extend beyond individual subjects. Furthermore, understanding areas of interest allows educators to align feedback more closely with the learner's motivations, thereby enhancing engagement. Generating proficiency scores for each topic and area of interest helps quantify the learner's understanding, providing precise insights that can be fed into a trained topic assessment LLM (e.g., the topic assessment ML module 118 shown in FIG. 1). The trained topic assessment LLM then uses these scores to generate targeted topic feedback, offering personalized guidance that clearly indicates the learner's proficiency levels across multiple domains, facilitating effective learning strategies.

At 407, the method 400 includes analyzing the course feedback using a trained topic assessment ML configured to evaluate a proficiency with one or more topics of study based on the course feedback for given topics and the past academic performance data of the learner for the one or more other courses completed by the learner that cover the given topics, and to generate a topic feedback comprising a performance of the learner in other topics related to the course materials and a failure risk regarding the course materials.

Analyzing course feedback with a trained topic assessment ML model is important for accurately evaluating a learner's proficiency in one or more topics of study. By leveraging course feedback alongside past academic performance data from related courses, the trained topic assessment ML can generate a nuanced understanding of how well a learner has mastered specific topics. This approach helps to identify not only current performance but also how past learning outcomes might influence understanding of new, related concepts. By integrating this historical data, the trained topic assessment ML can provide topic feedback that includes insights into the learner's performance across interconnected topics, offering a broader perspective on their overall academic development. Additionally, the trained topic assessment ML model can detect areas where the learner may be at risk of failure, highlighting specific challenges that require targeted support. This proactive analysis helps instructors and learners address potential learning gaps before they become significant barriers, fostering more effective and supportive educational experiences.

In some aspects, the trained topic assessment ML may include one or more of: a classification model, a regression classification model, an autoencoder neural network, or a neural network model.

At 409, the method 400 includes based on the topic feedback, generating, by a processor, and providing, via a UI, a plurality of personalized learning recommendations for one or more topics of study in which the learner has a level of proficiency below a proficiency threshold. The plurality of personalized learning recommendations may be based on the topic feedback. In some aspects, the personalized learning recommendations may include a personalized list of questions and answers related to topics that are detected as weak for the learner and topics which are detected as interesting for the learner.

In this way, the personalized learning recommendations may support learners in areas where their proficiency falls below an acceptable threshold. Personalized recommendations provide targeted strategies that are tailored to the learner's specific weaknesses and learning style, enabling more efficient and impactful improvement. By addressing gaps in knowledge with customized actions—such as suggesting specific exercises, resources, or focused study sessions—the learner is empowered to overcome challenges in a structured and approachable way. These personalized learning recommendations can also adjust the learning pace and content to align with the learner's current proficiency level, making the learning experience both supportive and motivating. Ultimately, providing these tailored interventions helps ensure that learners have the opportunity to bridge their learning gaps and achieve success across all topics of study.

In some aspects, generating the plurality of personalized learning recommendations for the learner may include: analyzing the topic feedback using a trained learning recommendations LLM configured to generate personalized learning recommendations based at least in part on the course materials.

By using the topic feedback, the trained learning recommendations LLM can identify areas where the learner is struggling or where their proficiency falls below expectations, and then create tailored recommendations that directly reference the content covered in the course. This ensures that the learning plan is not generic but instead grounded in the exact material the learner needs to master, making the path to improvement more effective and relevant. Personalized recommendations that are tied to the course materials help bridge the gap between individual learning needs and course expectations, ultimately enhancing comprehension and performance in the specific topics where learners need the most help. This approach supports a focused and structured path to mastery, ensuring learners can progress with confidence and clarity in their studies.

In some aspects, the method 400 may include: preparing the trained test assessment LLM by: (i) providing, to the trained test assessment LLM, a training dataset comprising at least one of: (a) a plurality of test questions, (b) a plurality of graded answers corresponding to the plurality of test questions indicating at least labeled correct answers, labeled partially correct answers, labeled incorrect answers, or explanation from the course materials, and (c) a plurality of scoring criteria corresponding to how a score is assigned, including: assigning different weights for at least conceptual understanding, accuracy, clarity, organization, style, or completeness, (d) descriptions of different proficiency levels with the test materials and criteria for each proficiency level, (e) labeled examples of test feedback provided by instructors including at least positive feedback, negative feedback, and constructive criticism, and (ii)

preparing the trained test assessment LLM using the provided training dataset.

In some aspects, the method 400 may include: preparing the trained topic assessment LLM by: (i) providing, to the trained topic assessment LLM, a training dataset comprising at least: (a) course material, (b) a plurality of test questions, (c) a plurality of graded test data corresponding to the plurality of test questions indicating at least labeled correct answers, labeled partially correct answers, or labeled incorrect answers, (d) descriptions of different proficiency levels with the one or more topics of study and criteria for each proficiency level, (e) labeled examples of categorized topic feedback provided by instructors including at least positive feedback, negative feedback, and constructive criticism, and (e) past academic performance data for the learner including at least test scores, grade distribution, completion rates, difficulty ratings, or progress over time, and (ii) preparing the trained topic assessment LLM using the provided training dataset.

In some aspects, the method 400 may include: preparing the learning recommendations LLM by: (i) providing, to the learning recommendations LLM, a training dataset comprising at least one of: (a) course materials, (b) academic performance data of the learner comprising at least past academic performance, previous courses taken, topics covered, test results, or an assignment performance, (c) feedback and assessment data including at least feedback on strengths, weaknesses, and areas for improvement for the learner or self-assessment data from the learner, and (d) demographic data of the learner comprising at least: age, education level, prior knowledge, or learning style, and (e) examples of personalized learning recommendations based on the course materials comprising at least sequences of topics, resources used, suggested readings, suggested exercises, and study plans, and (ii) preparing the learning recommendations LLM using the provided training dataset.

In some aspects, the method 400 may include: preparing the learner performance assessment LLM by: (i) providing, to the learner performance assessment LLM, a training dataset comprising at least one of: (a) academic performance data of the learner linked to specific topics comprising at least past academic performance, previous courses taken, topics covered, test results, or an assignment performance, (b) interest data of the learner, (c) demographic data of the learner comprising at least: age, education level, prior knowledge, or learning style, and (d) descriptions of different proficiency levels for each topic of study and each area of interest and criteria for each proficiency level, (ii) preparing the learner performance assessment LLM using provided training dataset.

Figure 5:
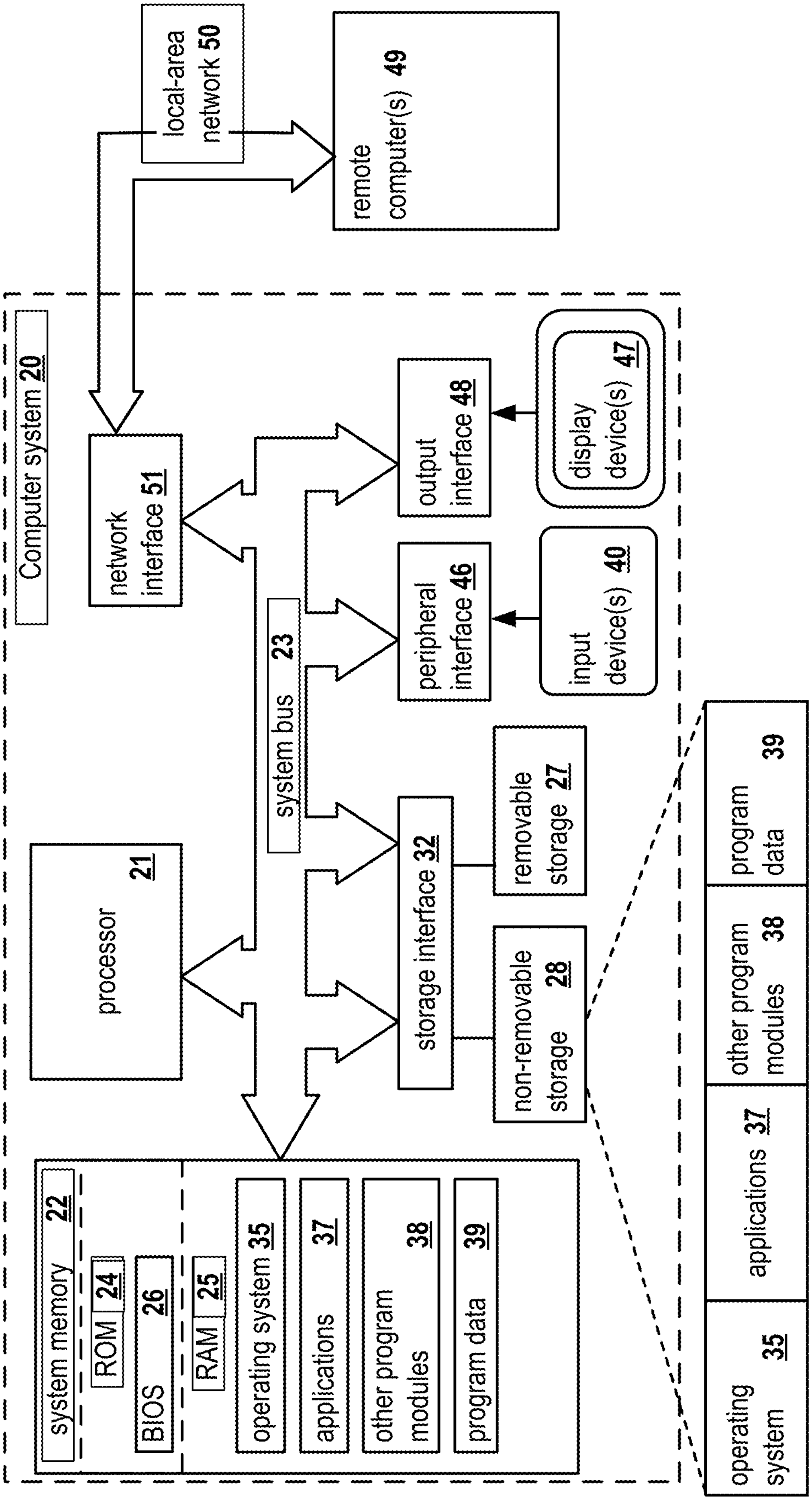
FIG. 5 presents an example of a general-purpose computer system on which aspects of the present disclosure can be implemented.

FIG. 5 is a block diagram illustrating a computer system 20 on which aspects of systems and methods for an online examination proctoring system may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-7 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A machine learning (ML) based method for assessing academic performance of a learner and providing learning recommendations, the method comprising:

obtaining assessment materials for a learner comprising at least: a plurality of test questions for an academic course taken by the learner, answers from the learner to the plurality of test questions, correct answers to the plurality of test questions, course materials, past academic performance data for the course by the learner and one or more other courses completed by the learner in a program of study of the learner, and learning management system (LMS) data corresponding to the learner, the LMS data comprising machine-generated engagement data including one or more of login timestamps, click data, navigation behavior, time spent on course resources, or sequences of actions taken by the learner within the LMS, wherein the plurality of test questions are mapped to respective topics of study covered by the course and one or more other courses completed by the learner within the program of study;

analyzing the answers using a trained test assessment LLM configured to:

compare the answers to the correct answers on a question-by-question basis, generate, for respective test questions of the plurality of test questions, correctness outputs indicating at least one of correct, partially correct, or incorrect, and generate test feedback indicating a level of proficiency with the test materials based on the correctness outputs;

analyzing the test feedback using a trained course assessment LLM configured to:

identify, for respective test questions of the plurality of test questions, corresponding portions of the course materials associated with the respective test questions and expected answers, map the correctness outputs and the test feedback for the respective test questions to the corresponding portions of the course materials, and generate course feedback comprising expected answers and course-material proficiency outputs indicating a level of proficiency with the corresponding portions of the course materials, wherein the course-material proficiency outputs are intermediate machine-generated outputs used by a trained topic assessment LLM;

analyzing the course feedback using the trained topic assessment LLM configured to:

aggregate, for each respective topic of study, the course-material proficiency outputs for the corresponding portions of the course materials associated with the respective topic of study, the past academic performance data of the learner for the one or more other courses completed by the learner that cover respective topic of study, and the machine-generated engagement data, derive behavioral pattern information of the learner from the machine-generated engagement data, and generate topic feedback comprising, for each respective topic of study, a topic-specific proficiency score and a performance of the learner in other topics related to the course materials, and further comprising a failure risk regarding the course materials; and based on the topic feedback, generating, by a processor, and providing, via a user interface (UI), a plurality of personalized learning recommendations for one or more topics of study in which the topic-specific proficiency score is below a proficiency threshold, wherein the plurality of personalized learning recommendations comprise an ordered personalized learning path including a sequence of the one or more topics of study and associated course resources selected based on the topic-specific proficiency scores and the failure risk regarding the course materials.

2. The method of claim 1, wherein generating the plurality of personalized learning recommendations for the learner further comprises:

analyzing the topic feedback using a trained learning recommendations LLM configured to generate the personalized learning recommendations based at least in part on the course materials, wherein the personalized learning recommendations of the ordered personalized learning path may include at least one of personal recommendations or non-course material recommendations based on learning objectives of the course.

3. The method of claim 1, further comprising:

collecting past academic performance data of the learner for the course and one or more other courses completed by the learner in the program of study for the learner;

collecting data about areas of interests of the learner related to the program of study;

analyzing the collected data using a trained learner performance assessment LLM configured to evaluate an overall academic performance of the learner within the program of study and proficiency with one or more topics of study and areas of interests, and to generate a score of proficiency for each topic of study and each area of interest; and providing the generated scores to the trained topic assessment LLM for generating the topic feedback indicating a level of proficiency with the one or more topics of study.

4. The method of claim 1, wherein the trained topic assessment LLM comprises one or more of: a classification model, a regression classification model, an autoencoder neural network, or a neural network model.

5. The method of claim 1, further comprising: preparing the trained test assessment LLM by:

(i) providing, to the trained test assessment LLM, a training dataset comprising at least one of:

(a) a plurality of test questions, (b) a plurality of graded answers corresponding to the plurality of test questions indicating at least labeled correct answers, labeled partially correct answers, labeled incorrect answers, or explanation from the course materials, and (c) a plurality of scoring criteria corresponding to how a score is assigned, including: assigning different weights for at least conceptual understanding, accuracy, clarity, organization, style, or completeness, (d) descriptions of different proficiency levels with the test materials and criteria for each proficiency level, (e) labeled examples of test feedback provided by instructors including at least positive feedback, negative feedback, and constructive criticism, and (ii) preparing the trained test assessment LLM using the provided training dataset.

6. The method of claim 1, wherein analyzing the test feedback using the trained course assessment LLM further comprises using a handbook comprising expected answers configured to enhance the course feedback based on achieving assessment criteria.

7. The method of claim 1, further comprising:

obtaining time-series data corresponding to user engagement with the LMS configured to facilitate the plurality of test questions for the academic course, wherein the time-series data comprises at least one of click data or engagement metrics with content from the course, wherein analyzing the course feedback using the trained topic assessment LLM is further based on analyzing the time-series data to provide insight into the behavioral pattern information of the learner.

8. The method of claim 1, further comprising: preparing the trained course assessment LLM by:

(i) providing, to the trained course assessment LLM, a training dataset comprising at least:

(a) course material, (b) a plurality of test questions, (c) a plurality of graded test data corresponding to the test questions indicating at least labeled correct answers, labeled partially correct answers, or labeled incorrect answers, (d) descriptions of different proficiency levels with the course material and criteria for each level, (e) labeled examples of categorized course feedback provided by instructors including at least positive feedback, negative feedback, and constructive criticism, and (f) historical course feedback summary comprising at least connections between the test feedback and overall course feedback, and (ii) preparing the trained course assessment LLM using the provided training dataset.

9. The method of claim 1, further comprising: preparing the trained topic assessment LLM by:

(i) providing, to the trained topic assessment LLM, a training dataset comprising at least:

(a) course material, (b) a plurality of test questions, (c) a plurality of graded test data corresponding to the plurality of test questions indicating at least labeled correct answers, labeled partially correct answers, or labeled incorrect answers, (d) descriptions of different proficiency levels with the one or more topics of study and criteria for each proficiency level, (e) labeled examples of categorized topic feedback provided by instructors including at least positive feedback, negative feedback, and constructive criticism, (f) past academic performance data for the learner including at least test scores, grade distribution, completion rates, difficulty ratings, or progress over time, and (g) LMS data including one or more of login timestamps, click data, navigation behavior, time spent on course resources, or sequences of actions taken by learners within an LMS, and (ii) preparing the trained topic assessment LLM using the provided training dataset.

10. The method of claim 1, further comprising preparing the trained learning recommendations LLM by:

(i) providing, to the trained learning recommendations LLM, a training dataset comprising at least one of:

(a) course materials, (b) academic performance data of the learner comprising at least past academic performance, previous courses taken, topics covered, test results, or an assignment performance, (c) feedback and assessment data including at least feedback on strengths, weaknesses, and areas for improvement for the learner or self-assessment data from the learner, (d) demographic data of the learner comprising at least: age, education level, prior knowledge, or learning style, and (e) examples of personalized learning recommendations based on the course materials comprising at least sequences of topics, resources used, suggested readings, suggested exercises, and study plans, and (ii) preparing the trained learning recommendations LLM using the provided training dataset.

11. The method of claim 1, further comprising: preparing the trained learner performance assessment LLM by:

(i) providing, to the trained learner performance assessment LLM, a training dataset comprising at least one of:

(a) academic performance data of the learner linked to specific topics comprising at least past academic performance, previous courses taken, topics covered, test results, or an assignment performance, (b) interest data of the learner, (c) demographic data of the learner comprising at least: age, education level, prior knowledge, or learning style, and (d) descriptions of different proficiency levels for each topic of study and each area of interest and criteria for each proficiency level, (ii) preparing the trained learner performance assessment LLM using provided training dataset.

12. A system for assessing academic performance of a learner and providing learning recommendations, comprising:

at least one memory;

at least one hardware processor coupled with the at least one memory and configured, individually or in combination, to:

obtain assessment materials for a learner comprising at least: a plurality of test questions for an academic course taken by the learner, answers from the learner to the plurality of test questions, correct answers to the plurality of test questions, course materials, past academic performance data for the course by the learner and one or more other courses completed by the learner in a program of study of the learner, and learning management system (LMS) data corresponding to the learner, the LMS data comprising machine-generated engagement data including one or more of login timestamps, click data, navigation behavior, time spent on course resources, or sequences of actions taken by the learner within the LMS, wherein the plurality of test questions are mapped to respective topics of study covered by the course and one or more other courses completed by the learner within the program of study;

analyze the answers using a trained test assessment LLM configured to:

compare the answers to the correct answers on a question-by-question basis, generate, for respective test questions of the plurality of test questions, correctness outputs indicating at least one of correct, partially correct, or incorrect, and generate test feedback indicating a level of proficiency with the test materials based on the correctness outputs;

analyze the test feedback using a trained course assessment LLM configured to:

identify, for respective test questions of the plurality of test questions, corresponding portions of the course materials associated with the respective test questions and expected answers, map the correctness outputs and the test feedback for the respective test questions to the corresponding portions of the course materials, and generate course feedback comprising expected answers and course-material proficiency outputs indicating a level of proficiency with the corresponding portions of the course materials, wherein the course-material proficiency outputs are intermediate machine-generated outputs used by a trained topic assessment LLM;

analyze the course feedback using the trained topic assessment LLM configured to:

aggregate, for each respective topic of study the course-material proficiency outputs for the corresponding portions of the course materials associated with the respective topic of study, the past academic performance data of the learner for the one or more other courses completed by the learner that cover the respective topic of study, and the machine-generated engagement data, derive behavioral pattern information of the learner from the machine-generated engagement data, and generate topic feedback comprising, for each respective topic of study, a topic-specific proficiency score and a performance of the learner in other topics related to the course materials, and further comprising a failure risk regarding the course materials; and based on the topic feedback, generate, by the at least one hardware processor, and provide, via a user interface (UI), a plurality of personalized learning recommendations for one or more topics of study in which the topic-specific proficiency score is below a proficiency threshold, wherein the plurality of personalized learning recommendations comprise an ordered personalized learning path including a sequence of the one or more topics of study and associated course resources selected based on the topic-specific proficiency scores and the failure risk regarding the course materials.

13. The system of claim 12, wherein generating the plurality of personalized learning recommendations for the learner further comprises:

analyzing the topic feedback using a trained learning recommendations LLM configured to generate the personalized learning recommendations based at least in part on the course materials, wherein the personalized learning recommendations of the ordered personalized learning path may include at least one of personal recommendations or non-course material recommendations based on learning objectives of the course.

14. The system of claim 12, wherein the at least one hardware processor is further configured to:

collect past academic performance data of the learner for the course and one or more other courses completed by the learner in the program of study for the learner;

collect data about areas of interests of the learner related to the program of study;

analyze the collected data using a trained learner performance assessment LLM configured to evaluate an overall academic performance of the learner within the program of study and proficiency with one or more topics of study and areas of interests, and to generate a score of proficiency for each topic of study and each area of interest; and provide the generated scores to the trained topic assessment LLM for generating the topic feedback indicating a level of proficiency with the one or more topics of study.

15. The system of claim 12, wherein the trained topic assessment LLM comprises one or more of: a classification model, a regression classification model, an autoencoder neural network, or a neural network model.

16. The system of claim 12, further comprising: preparing the trained test assessment LLM by:

(i) providing, to the trained test assessment LLM, a training dataset comprising at least one of:

(a) a plurality of test questions, (b) a plurality of graded answers corresponding to the plurality of test questions indicating at least labeled correct answers, labeled partially correct answers, labeled incorrect answers, or explanation from the course materials, and (c) a plurality of scoring criteria corresponding to how a score is assigned, including: assigning different weights for at least conceptual understanding, accuracy, clarity, organization, style, or completeness, (d) descriptions of different proficiency levels with the test materials and criteria for each proficiency level, (e) labeled examples of test feedback provided by instructors including at least positive feedback, negative feedback, and constructive criticism, and (ii) preparing the trained test assessment LLM using the provided training dataset.

17. The system of claim 12, wherein analyzing the test feedback using the trained course assessment LLM further comprises using a handbook comprising expected answers configured to enhance the course feedback based on achieving assessment criteria.

18. The system of claim 12, wherein the at least one hardware processor is further configured to:

obtain time-series data corresponding to user engagement with the LMS configured to facilitate the plurality of test questions for the academic course, wherein the time-series data comprises at least one of click data or engagement metrics with content from the course, wherein analyzing the course feedback using the trained topic assessment LLM is further based on analyzing the time-series data to provide insight into the behavioral pattern information of the learner.

19. The system of claim 12, wherein the at least one hardware processor is further configured to:

(i) provide, to the trained course assessment LLM, a training dataset comprising at least:

(a) course material, (b) a plurality of test questions, (c) a plurality of graded test data corresponding to the test questions indicating at least labeled correct answers, labeled partially correct answers, or labeled incorrect answers, (d) descriptions of different proficiency levels with the course material and criteria for each level, (e) labeled examples of categorized course feedback provided by instructors including at least positive feedback, negative feedback, and constructive criticism, and (f) historical course feedback summary comprising at least connections between the test feedback and overall course feedback, and (ii) train the course assessment LLM using the provided training dataset.

20. A non-transitory computer readable medium storing thereon computer executable instructions for assessing academic performance of a learner and providing learning recommendations, including instructions for:

obtaining assessment materials for a learner comprising at least: a plurality of test questions for an academic course taken by the learner, answers from the learner to the plurality of test questions, correct answers to the plurality of test questions, course materials, past academic performance data for the course by the learner and one or more other courses completed by the learner in a program of study of the learner, and learning management system (LMS) data corresponding to the learner, the LMS data comprising machine-generated engagement data including one or more of login timestamps, click data, navigation behavior, time spent on course resources, or sequences of actions taken by the learner within the LMS, wherein the plurality of test questions are mapped to respective topics of study covered by the course and one or more other courses completed by the learner within the program of study;

analyzing the answers using a trained test assessment LLM configured to:

compare the answers to the correct test answers on a question-by-question basis, generate, for respective test questions of the plurality of test questions, correctness outputs indicating at least one of correct, partially correct, or incorrect, and generate test feedback indicating a level of proficiency with the test materials based on the correctness outputs;

analyzing the test feedback using a trained course assessment LLM configured to:

identify, for respective test questions of the plurality of test questions, corresponding portions of the course materials associated with the respective test questions and expected answers, map the correctness outputs and the test feedback for the respective test questions to the corresponding portions of the course materials, and generate course feedback comprising expected answers and course-material proficiency outputs indicating a level of proficiency with the corresponding portions of the course materials, wherein the course-material proficiency outputs are intermediate machine-generated outputs used by a trained topic assessment LLM;

analyzing the course feedback using the trained topic assessment LLM configured to:

aggregate, for each respective topic of study, the course-material proficiency outputs for the corresponding portions of the course materials associated with the respective topic of study, the past academic performance data of the learner for the one or more other courses completed by the learner that cover the respective topic of study, and the machine-generated engagement data, derive behavioral pattern information of the learner from the machine-generated engagement data, and generate topic feedback comprising, for each respective topic of study, a topic-specific proficiency score and a performance of the learner in other topics related to the course materials, and further comprising a failure risk regarding the course materials; and based on the topic feedback, generating, by a processor, and providing, via a user interface (UI), a plurality of personalized learning recommendations for one or more topics of study in which the topic-specific proficiency score is below a proficiency threshold, wherein the plurality of personalized learning recommendations comprise an ordered personalized learning path including a sequence of the one or more topics of study and associated course resources selected based on the topic-specific proficiency scores and the failure risk regarding the course materials.

* * * * *